Patented July 26, 1949

2,477,548

UNITED STATES PATENT OFFICE 2,477,548

POLYALLYL ETHER COMPOSITIONS CONTAINING AN ORTHOSILICIC ACID ESTER

John Robert Roach, Minneapolis, Minn., assignor to General Mills, Inc., a corporation of Delaware No Drawing. Application June 17, 1946
Serial No. 677,424

10 Claims. (Cl. 260—41)

The present invention relates to improved polyallyl ether compositions especially useful for application as a surface coating, for molding into articles, and for impregnating porous articles such as wood, cloth, and paper.

Polyallyl ether compositions have been used for many of the above purposes. In order that these compositions may dry within a reasonable period of time, it is customary to employ various metallic driers, such as the naphthenates of lead, cobalt, manganese and the like. The use of such driers results in compositions which dry within a reasonable length of time, but which possess inferior physical properties as compared to films prepared from the same polyallyl ethers in the absence of the drier. These films are noticeably inferior in that they lack the strength and hardness of the film prepared in the absence of drier.

It has now been discovered that it is possible to improve the physical properties of polyallyl ether compositions by including therein various esters of orthosilicic acid. The use of these esters of orthosilicic acid overcomes the deleterious effect ordinarily encountered in the use of metallic driers. Thus the films or sheets prepared from a composition of the type described herein possess the desirable properties such as excellent wear resistance, durability, insolubility, infusibility, extreme hardness, and resistance to water, alkali, acid and other chemicals, even in the presence of a drier. A further advantage of these compositions is that they are heat and fire resistant, and possess excellent adhesion to glass, metal, and wood.

It is therefore an object of the present invention to provide novel polyallyl ether compositions containing orthosilicate esters.

It is another object of the present invention to provide polyallyl ether compositions containing metallic driers, and which are capable of drying to films possessing excellent wear resistance, durability, infusibility, insolubility, extreme hardness, resistance to water, alkali, acid, and other chemicals, adhesion to glass, metal and wood, and heat and fire resistance.

It is a further object of the present invention to provide polymerized polyallyl ether orthosilicate ester compositions.

These and other objects of the invention will be more fully apparent from the following description of the invention with particular reference to the specific examples which are to be considered as illustrative only and not as limiting the invention.

The compositions contemplated by the present invention are, in general, polyallyl ethers of any polyhydric alcohol. Thus polyallyl ethers of glycerols, polyglycerols, glycols, polyglycols, sugars such as sucrose, glucose, sorbose, and the like, starch, cellulose, polyhydric condensation products of formaldehyde and ketones, such as 2,2,6,6-tetramethylol cyclohexanol, and the like, and in general, the polyallyl ether of any polyhydric alcohol may be used.

The extent of allylation may be varied depending upon the type of product desired, but in general, it is preferred to employ ethers which have been allylated to a high degree of substitution.

The orthosilicate esters contemplated by the present invention are the alkyl orthosilicates of monohydric alcohols such as tetramethyl orthosilicate, tetraethyl orthosilicate, tetrapropyl orthosilicate, the corresponding condensed monohydric alcohol silicates, the polyhydric alcohol silicates such as the glycerol silicates and the ethylene glycol silicates, and the condensed polyhydric alcohol silicates. The silicates are preferably employed in a partially hydrolyzed form, although they may be used in the unhydrolyzed form. Many of the unhydrolyzed silicate esters are appreciably volatile even at room temperature and are quite volatile at paint baking temperatures. In the presence of moist air they will undergo hydrolysis and to some degree may also react with the unsubstituted hydroxyl groups of the allyl ethers to become permanently combined in the film. However, an appreciable quantity of the esters may be lost by vaporization before they are converted to a non-volatile form through hydrolysis and possibly through reaction with the unsubstituted hydroxyl group of the allyl ethers. For these reasons, it is preferred to employ the silicates in the form of partially hydrolyzed esters, which are appreciably less volatile than the ester and which are still soluble in organic solvents.

The above silicate ester may be readily prepared by well-known methods. The condensed monohydric alcohol orthosilicates and the condensed polyhydric alcohol orthosilicates may be prepared by a carefully controlled hydrolysis of the corresponding orthosilicate in an ethyl alcohol medium, either in a neutral or slightly acidic solution. The polyhydric alcohol silicates may be prepared by reacting the polyhydric alcohol with the alkyl orthosilicate according to well-known methods.

The compositions of the present invention are prepared in general as follows: The desired silicate ester is dissolved in a solvent, for example, ethyl alcohol, and then the partially polymerized polyallyl ether or the monomeric polyallyl ether is added, either in the absence or presence of a solvent. In most instances the condensed silicate ester is compatible in all proportions with the polyallyl compound but, since higher concentrations of the silicate ester increase the hardness of the film and decrease its flexibility, for those instances where the silicate ester is used merely to overcome the deleterious effect of the metallic driers, it is preferred to use compositions containing up to 30% of the silicate ester and the remainder the polyallyl ether. In other instances where increased hardness, fireproofness, etc., are desired, larger amounts of the silicate esters may be used. The usual metallic driers may be used to accelerate the polymerization, for example, the stearates or naphthenates of lead, cobalt, manganese, etc. It has been found desirable to use 0.05% manganese and 0.05% cobalt as the naphthenates, based on the weight of the polyallyl ether in the composition.

The composition consisting of monomeric polyallyl ether, or preferably partially polymerized polyallyl ether, condensed silicate ester and metallic drier may be applied as a protective coating in any desired manner, for example, by painting, dipping, spraying, etc. The films can then be allowed to polymerize at room temperature or, in order to greatly accelerate the polymerization, the coated article may be heated to 70–100° C. for a relatively short period of time. These coatings exhibit extreme hardness and strength, with excellent adhesion to the surface of the article.

The above composition may likewise be used for impregnating porous materials such as paper, wood, cloth, etc., and laminates may be thus prepared by polymerization under slight pressure with heating in the usual manner. Likewise the above composition may be partially polymerized to form a fusible polymer which may be molded or otherwise shaped and polymerized by conventional methods.

Example 1

A sample of triallyl glycerol was partially polymerized by conventional methods to approximately 100 times its original viscosity. It was then mixed with alcohol soluble hydrolyzed tetraethyl orthosilicate in varying amounts (between 10 and 100% of the silicate, based on the weight of the allyl glycerol) and 0.05% cobalt and 0.05% manganese naphthenates were added, based on the weight of the allyl glycerol. Films were cast on glass and were tack free in 3 hours at room temperature. After baking for 12 hours or less at 78° C. all of the films were extremely hard, were very clear, showed good compatibility, had excellent adhesion to glass, and were very resistant to water and other chemicals. When similar compositions were prepared in the absence of the metallic drier, compatibility was good up to 30% hydrolyzed tetraethyl orthosilicate, based on the weight of allyl glycerol. Excellent films were likewise obtained from compositions containing up to 30% of hydrolyzed tetraethyl orthosilicate in the absence of metallic drier, but the films were slower in polymerizing. A sample of triallyl glycerol, polymerized under similar conditions in the presence of metallic driers but in the absence of a silicate ester, gave a much weaker and softer film.

Example 2

Compositions of partially polymerized allyl ether of 2,2,6,6-tetramethylol cyclohexanol, alcohol soluble hydrolyzed tetraethyl orthosilicate and cobalt-manganese driers were prepared in a manner similar to the method disclosed in Example 1. Excellent compatibility was observed in all mixtures containing up to 150% of the hydrolyzed silicate ester based on the weight of the polyallyl ether, whereas in the absense of metallic driers the compatibility was good in mixtures containing up to 30% of the hydrolyzed silicate ester. The films were comparable to those obtained in Example 1.

Example 3

Compositions of unpolymerized allyl starch (acetone soluble), alcohol soluble hydrolyzed tetraethyl orthosilicate and cobalt-manganese driers were prepared in acetone, as well as other solvents, and films were cast on glass. Compatibility was good up to 50% of hydrolyzed silicate ester. The films were tack free in one hour at room temperature and upon baking two hours at 78° C. became very hard and had excellent adhesion. The films were much stronger than those which contained metallic driers but no silicate ester.

Example 4

Compositions of the partially polymerized allyl ether of the polyhydric alcohol formed by the condensation of formaldehyde and ethyl methyl ketone, and alcohol soluble hydrolyzed tetraethyl orthosilicate were prepared according to Example 1. The composition showed good compatibility up to 20% of hydrolyzed tetraethyl orthosilicate in the presence of cobalt-manganese driers. The films possessed the properties of increased hardness, adhesion, etc., comparable to the other allyl ether silicate composition films.

Example 5

A polyhydric alcohol silicate was prepared by reacting the polyhydric alcohol with an alkyl silicate in accordance as follows: Thirty parts of tetraethyl orthosilicate and 6 parts of ethylene glycol were heated two hours at 100° C. and the product was dissolved in alcohol. Compositions containing up to 30% of this polyhydric alcohol silicate and partially polymerized allyl ether of the formaldehyde-ethyl methyl ketone condensation product were prepared and after the addition of metallic driers, films were cast on glass and were baked at 78° C. Compatibility was very good and the films possessed excellent physical and chemical properties.

From the above examples, it is apparent that different polyallyl ethers are compatible with hydrolyzed tetraethyl orthosilicate to different degrees. However, in overcoming the deleterious effect of the metallic driers on polyallyl films, 10–20% of the orthosilicate esters (based on the weight of the polyallyl ether) is about as effective as higher concentrations of silicate esters. For increased hardness, fireproofness, and the like, more silicate is desirable, and in that case, it is preferable to choose a polyallyl ether having greater compatibility with the silicate, for example, triallyl glycerol.

It is evident from the above description that the present invention provides novel polyallyl ether compositions containing orthosilicate esters, which compositions are capable of producing films of excellent wear resistance, durability, insolubility, infusibility, extreme hardness, resistance to water, alkali, acid and other chemicals, resistance to fire and heat, and capable of adhering to glass, metal, and wood, even in the presence of metallic driers.

While numerous modifications of the invention have been described, other embodiments will be apparent to those skilled in the art without departing from the spirit of the invention. Accordingly it is to be understood that the invention is not limited to the specific examples described herein, but may be varied within the scope of the following claims.

I claim as my invention:

1. A composition of matter comprising a polyallyl ether of a polyhydric alcohol, and a non-volatile saturated ester of orthosilicic acid in an amount not less than 10% based on the weight of the polyallyl ether.

2. A composition of matter comprising a polyallyl ether of a polyhydric alcohol, a non-volatile saturated ester of orthosilicic acid in an amount not less than 10% based on the weight of the polyallyl ether, and a metallic drier.

3. A composition of matter comprising a polyallyl ether of a polyhydric alcohol, and a partially hydrolyzed saturated ester of orthosilicic acid in an amount not less than 10% based on the weight of the polyallyl ether.

4. A composition of matter comprising a partially polymerized polyallyl ether of a polyhydric alcohol, and a non-volatile saturated ester of orthosilicic acid in an amount not less than 10% based on the weight of the polyallyl ether.

5. A composition of matter comprising a polyallyl ether of a polyhydric alcohol, and a non-volatile saturated ester of orthosilicic acid in an amount not less than 10%, based on the weight of the polyallyl ether.

6. A composition of matter comprising a polymer of a polyallyl ether of a polyhydric alcohol, and a non-volatile saturated ester of orthosilicic acid in an amount not less than 10% based on the weight of the polyallyl ether.

7. A composition of matter comprising a polymer of a polyallyl ether of a polyhydric alcohol, a non-volatile saturated ester of orthosilicic acid in an amount not less than 10% based on the weight of the polyallyl ether, and a metallic drier.

8. The product of claim 1 in which the ester is an alkyl ester.

9. The product of claim 1 in which the ester is an ethyl ester.

10. The product of claim 3 in which the ester is an ethyl ester.

JOHN ROBERT ROACH.

REFERENCES CITED

The following references are of record in the file of this patent:

UNITED STATES PATENTS

| Number | Name | Date |
| --- | --- | --- |
| 2,332,461 | Muskat et al. | Oct. 19, 1943 |